United States Patent [19]

Kotera et al.

[11] Patent Number: 4,736,254
[45] Date of Patent: Apr. 5, 1988

[54] METHOD AND APPARATUS FOR GENERATING PSEUDO-HALFTONE DOTS BY COMPARING GRAY SCALE VALUES OF AN ORIGINAL WITH DITHER THRESHOLD VALUES STORED IN CELLS OF A MATRIX ARRAY DIVIDED INTO IMAGINARY MATRICES OF ELEMENTAL AREAS EACH CONTAINING ONE CELL

[75] Inventors: Hiroaki Kotera, Kawasaki; Motohiko Naka, Tokyo, both of Japan

[73] Assignee: Matsushita Electric Industrial Co., Ltd., Japan

[21] Appl. No.: 800,439

[22] Filed: Nov. 21, 1985

[30] Foreign Application Priority Data

Nov. 22, 1984 [JP] Japan ................... 59-247328
Nov. 30, 1984 [JP] Japan ................... 59-253134

[51] Int. Cl.$^4$ ................... H04N 1/40
[52] U.S. Cl. ................... 358/283; 358/298
[58] Field of Search ................... 358/283, 298

[56] References Cited

U.S. PATENT DOCUMENTS

| 4,032,978 | 6/1977 | Wong | 358/283 |
| 4,517,605 | 5/1985 | Yokomizo | 358/283 |
| 4,553,173 | 11/1985 | Kawamura | 358/283 |

FOREIGN PATENT DOCUMENTS

| 0074794 | 3/1983 | European Pat. Off. | 358/283 |
| 117478 | 9/1981 | Japan | 358/283 |
| 99867 | 6/1982 | Japan | 358/283 |
| 189782 | 10/1984 | Japan | 358/283 |
| 59866 | 4/1985 | Japan | 358/283 |
| 113582 | 6/1985 | Japan | 358/283 |
| 116283 | 6/1985 | Japan | 358/283 |

Primary Examiner—James J. Groody
Assistant Examiner—Randall S. Svihla
Attorney, Agent, or Firm—Lowe, Price, LeBlanc, Becker & Shur

[57] ABSTRACT

A halftone signal having one of two discrete levels is generated for each print position along each print line by comparison between a gray scale value of an original with a threshold value stored in a memory. The memory has an $\alpha M \times \beta N$ matrix array of cells each storing a particular threshold value, where M, N, $\alpha$ and $\beta$ are integers. The memory is divided into $\alpha \times \beta$ identical imaginary matrices of $M \times N$ elemental areas each containing a cell in a particular one of $\alpha \times \beta$ positions. The threshold values stored in each imaginary matrix have a prescribed ordered-dither distribution and those stored in positionally corresponding elemental areas have a dot-dispersive or a dot-concentrative distribution. The memory is addressed in a given direction in response to each print position and in a direction normal to the given direction in response to each print line to read a stored threshold value for each print position for comparison with the gray scale value.

36 Claims, 9 Drawing Sheets

MESH AND EQUATION 2 (DOT-DISPERSIVE)

METHOD AND APPARATUS FOR GENERATING PSEUDO-HALFTONE DOTS BY COMPARING GRAY SCALE VALUES OF AN ORIGINAL WITH DITHER THRESHOLD VALUES STORED IN CELLS OF A MATRIX ARRAY DIVIDED INTO IMAGINARY MATRICES OF ELEMENTAL AREAS EACH CONTAINING ONE CELL

BACKGROUND OF THE INVENTION

The present invention relates to the generation of a halftone signal by comparison between an original gray scale value and a threshold value having a prescribed ordered-dither distribution.

Facsimile receivers and dot printers are of the type wherein the printing of dots is essentially an all or nothing binary process. While this all or nothing process is desirable for printing alphanumeric characters or other symbols, it is disadvantageous for printing images having gray scales or light gradations in continuous tones. This problem has been solved by transforming the continuous tone of the original image into halftone or pseudo halftone images using a mesh distribution or ordered-dither distribution known as "dither". Pseudo halftone images comprise a varying number of dots corresponding to the shades or tones to be reproduced. When the dots are small compared to the visual sharpness of the human eye, they are subliminal to the eye and are not recognized. Thus, dots and spaces visually fuse together on a writing surface to present a continuous tone.

One typical example of pseudo halftone generators as shown and described in U.S. Pat. No. 4,032,978 comprises a pseudo-random number generator and a comparator that compares input gray scale levels $X_{ij}$ (where i and j are representative of the row and column positions of a matrix array, respectively, in which dots and spaces are indicated) with the output of the pseudo-random number generator to produce a print signal $G_{ij}$ depending on whether the gray scales are higher or lower than a "dithered" reference $D_{ij}$ represented by the pseudo-random number. The reference $D_{ij}$ is varied according to a prescribed pseudo-randomness, or probability of occurrences in the directions of the rows and columns so that the output $G_{ij}$ has a distribution in which the ratio of dots and spaces varies with the prescribed randomness.

It is desirable to provide different distributions of dots and spaces according to different shades or optical density to improve continuous tones. However, the prior art halftone generator is not satisfactory in terms of the degree of freedom for selecting a desired dither distribution of threshold values.

SUMMARY OF THE INVENTION

It is therefore an object of the present invention to provide an apparatus and method that permits the determination of a halftone value with a freedom of choice from among different ordered-dither threshold distributions according to different optical densities, or gray scale values.

This object is obtained by dividing a matrix array of a memory into a plurality of identical "imaginary" matrices and storing threshold values in particular cells of each imaginary matrix according to a prescribed ordered-dither distribution.

According to the present invention, there is provided an apparatus for generating a print signal having one of two discrete levels for each of print positions along each of a plurality of print lines depending on a gray scale value of an original relative to a threshold value. The apparatus comprises a memory having an $\alpha M \times \beta N$ matrix array of cells each storing a particular threshold value, where M, N, $\alpha$ and $\beta$ are integers, at least one of $\alpha$ and $\beta$ being greater than unity and at least one of M and N being greater than unity. The matrix array is divided into $d \times B$ identical imaginary matrices of $M \times N$ elemental areas each containing a cell, in particular one of $\alpha \times \beta$ positions. The threshold values of each of the imaginary matrices have a prescribed ordered-dither distribution on the plane of each imaginary matrix. A first counter is incremented in response to each print position for addressing the memory in a given direction and a second counter is incremented in response to each print line for addressing the memory in a direction normal to the given direction to sequentially read the stored threshold values from the memory for each print position. A comparator is provided for comparing the gray scale value of the original with each of the threshold values read out of the memory and generating a print signal representative of one of the discrete levels.

Preferably, the threshold values which are stored in the cells of positionally corresponding elemental areas of the imaginary matrices form a group of successively varying threshold values for each elemental area according to a prescribed numerical relationship between the imaginary matrices.

BRIEF DESCRIPTION OF THE DRAWINGS

The present invention will be described in further detail with reference to the accompanying drawings, in which.

DETAILED DESCRIPTION

Figure 1:
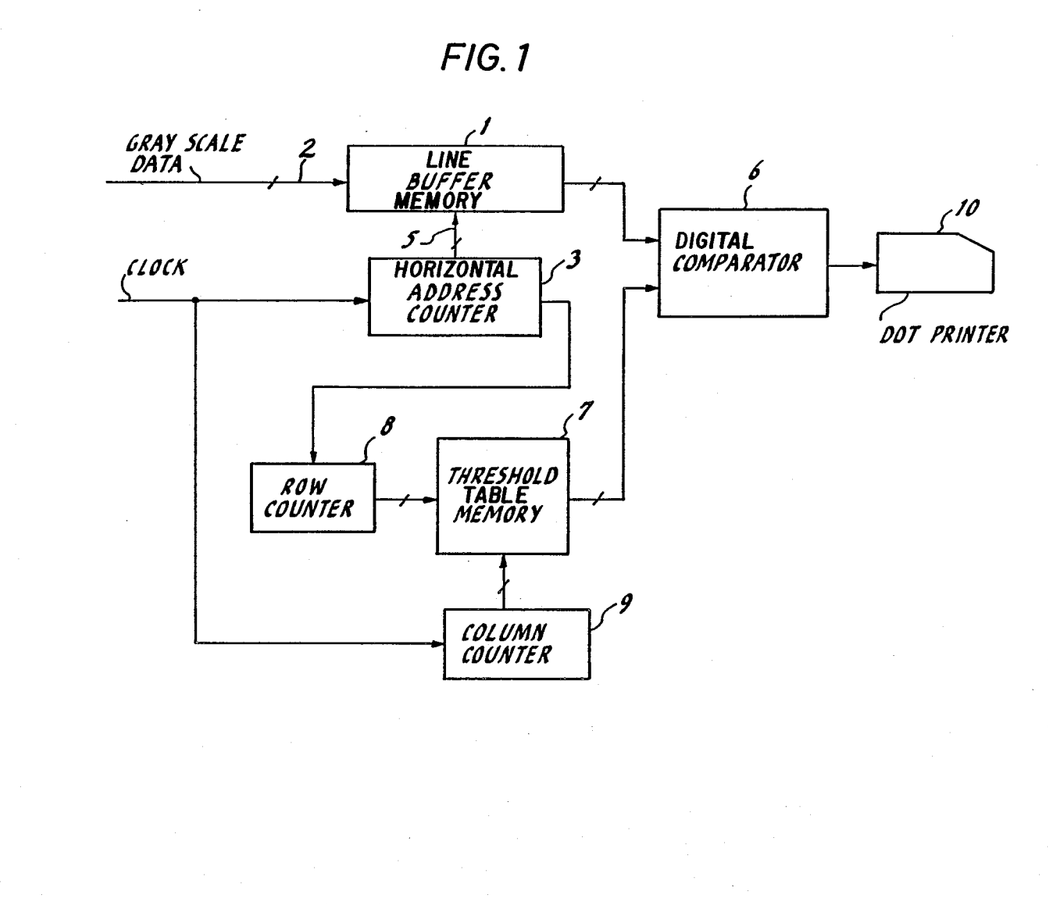
FIG. 1 is a block diagram of a pseudo halftone generator embodying the present invention.

Pseudo halftone as discussed herein refers to the process of reproducing continuous tone images or gray scales with a printing device having only two levels of gray, namely, black and white, and operating with a fixed printed dot size and fixed dot-to-dot spacing. An embodiment of the pseudo halftone generator of the present invention is illustrated in FIG. 1. In the embodiment shown, a quantized, binary coded gray scale input is supplied to a line buffer memory 1 on lines 2. The gray scale input typically comprises 6-bit words each representing the gray scale level of a pixel or "dot" image of the original halftone picture, so that it can be represented with a resolution of sixty-four ($=2^6$) levels of gradation. Digital bits of a full print line are stored into the memory 1. A clock pulse is applied to a horizontal address 11, or "row" counter 3 on line 4 in synchronism with the application of each 6-bit word to the buffer memory 1. Address codes are successively generated by counter 3 and supplied on lines 5 to buffer memory 1 for addressing successive storage locations of the memory to read the stored 6-bit words out of it into a digital comparator 6. Comparator 6 provides a comparison between each 6-bit word from memory 1 and a 6-bit word read out of a threshold table memory 7 which represents an ordered-dither threshold variation. If the digital value of the output of line memory 1 is lower than the threshold, comparator 6 supplies a logical 0 to a dot printer 10 and if it is higher than the threshold comparator 1 supplies a to the dot printer.

For purposes of illustration, table memory 7 comprises cells arranged in a matrix array of 8 rows and 8 columns. Horizontal address counter 3 increments a three-bit "row" counter 8 upon the completion of a print line to cause it to generate a "row" address for the table memory 7. The column address of the memory 7 is generated by a three-bit "column" counter 9 by counting the clock pulses on line 4. Six-bit threshold representative words are serially read out of memory 7 in the direction of its rows in synchronism with the six-bit data words from buffer memory 1 and supplied to digital comparator 6. Threshold data stored in each row of the memory 7 are therefore repeatedly read out of it into comparator 6 in response to row counter 8 being incremented as a line print is completed. All the stored data are therefore repeatedly read out of memory 7 until the print position reaches the end of a full page. A series of pulses is generated by comparator 6 and fed to dot printer 10 to produce a pseudo halftone image on successive print lines.

Figure 2:
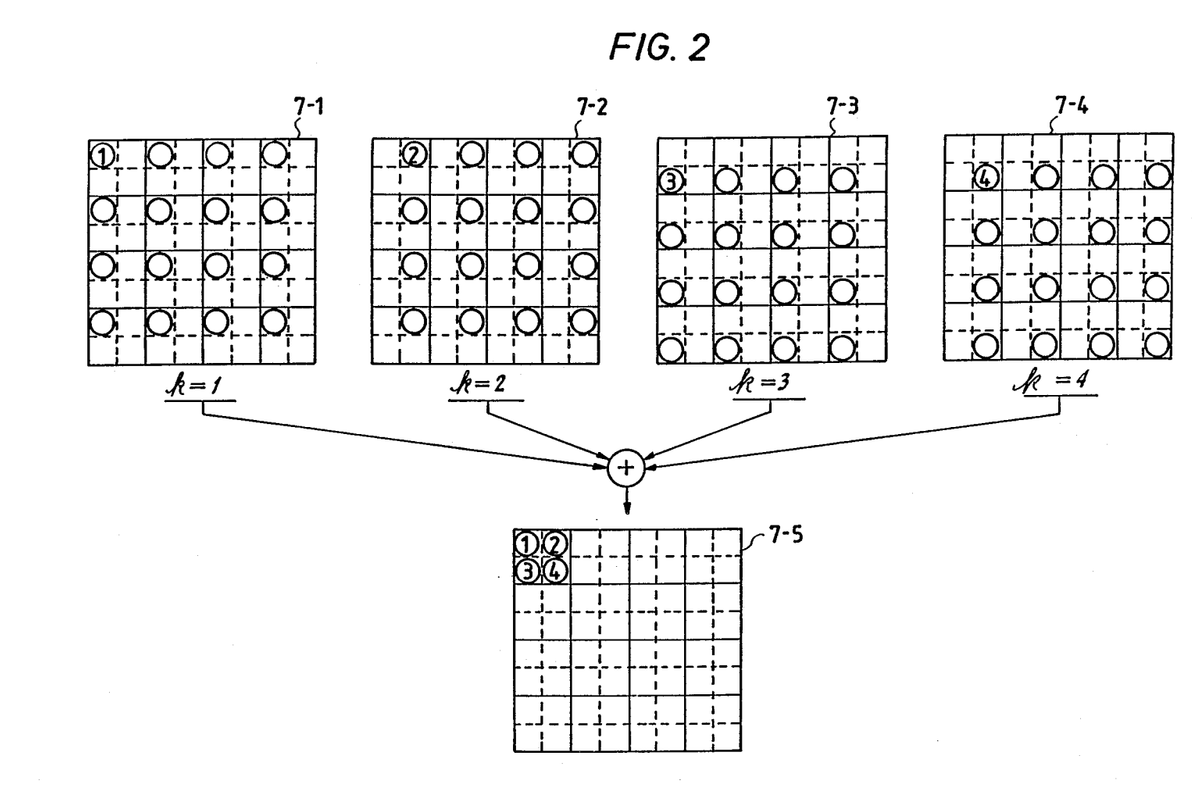
FIG. 2 is a digrammatic representation of an ordered-dither distribution of threshold levels useful for describing the underlying principle of the invention.

FIG. 2 is an illustration of the basic architecture of the table memory 7. Memory 7 is divided into a plurality of identical "imaginary memory layers", or matrices 7-1, 7-2, 7-3 and 7-4. Each matrix is divided into sixty-four ($=8\times8$) cells, as indicated by intersecting broken lines. Each cell corresponds to a dot on the print line and stores a particular 6-bit word representing a pseudo random threshold variable. Each imaginary matrix is further divided by intersecting solid lines into a 4-by-4 matrix of sixteen "elements". Each element stores in a particular one of its four positions a particular one of threshold values having an ordered-dither distribution on each imaginary matrix. The ordered dither variables $C_{kij}$ (where k identifies the 4-by-4 matrices, or "phases", i and j represent the column and row positions of the 4-by-4 matrices) stored in the matrices 7-1 to 7-4 are given by:

$$C_{kij} = C_{lij} + k - 1 \quad (1)$$

where, $C_{lij}$ represents the initial pseudo-random variable of phase "1" for each series of consecutive numbers. In the illustrated embodiment, $C_{111}$ is assumed to be "1" and consecutive numbers "1", "2", "3" and "4" and upper-left, upper-right, lower-left and lower-right cells of the element at the first row and first column of the 4-by-4 matrices 7-1, 7-2, 7-3 and 7-4, respectively (or phases k=1, k=2, k=3 and k=4, respectively). With all the cells of the matrices being filled with variables $C_{kij}$, the "imaginary" matrices are overlaid one upon another to produce a composite matrix 7-5.

The ordered dither variables $C_{kij}$ can also be given by:

$$C_{kij} = C_{lij} + n(k-1) \quad (2)$$

where, n is the number of elements in each of the 4-by-4 matrices.

The distribution of initial dither variables $C_{lij}$ on the first phase "imaginary" matrix is determined in accordance with an "ordered dither" pattern which is available in a number of conventional methods known as "Bayer", "mesh" or "spiral" distribution. It is found that with the ordered dither pattern according to Equation 1 there is a tendency for dots to concentrate. With the pattern according to Equation 2 there is a tendency for dots to disperse. Thus, Equations 1 and 2 can be used advantageously for different applications. For example, Equation 1 is used for applications where a high degree of gradation is desired. Whereas Equation 2 is used for applications where a high degree of image resolution is desired.

The present invention allows Equations 1 and 2 to be selectively combined with one of the Bayer, mesh and spiral distributions to generate particular halftone characteristics for different optical densities. The Bayer distriubtion is known to impart a dot-dispersive characteristic and the spiral distribution a dot-concentrative characteristic. The dot-dispersive and dot-concentrative characteristics are suitable for emphasizing image resolution and image gradation, respectively. The mesh distribution is known to impart a characteristic which is intermediate the characteristics of the Bayer and spiral distributions.

Figure 3:
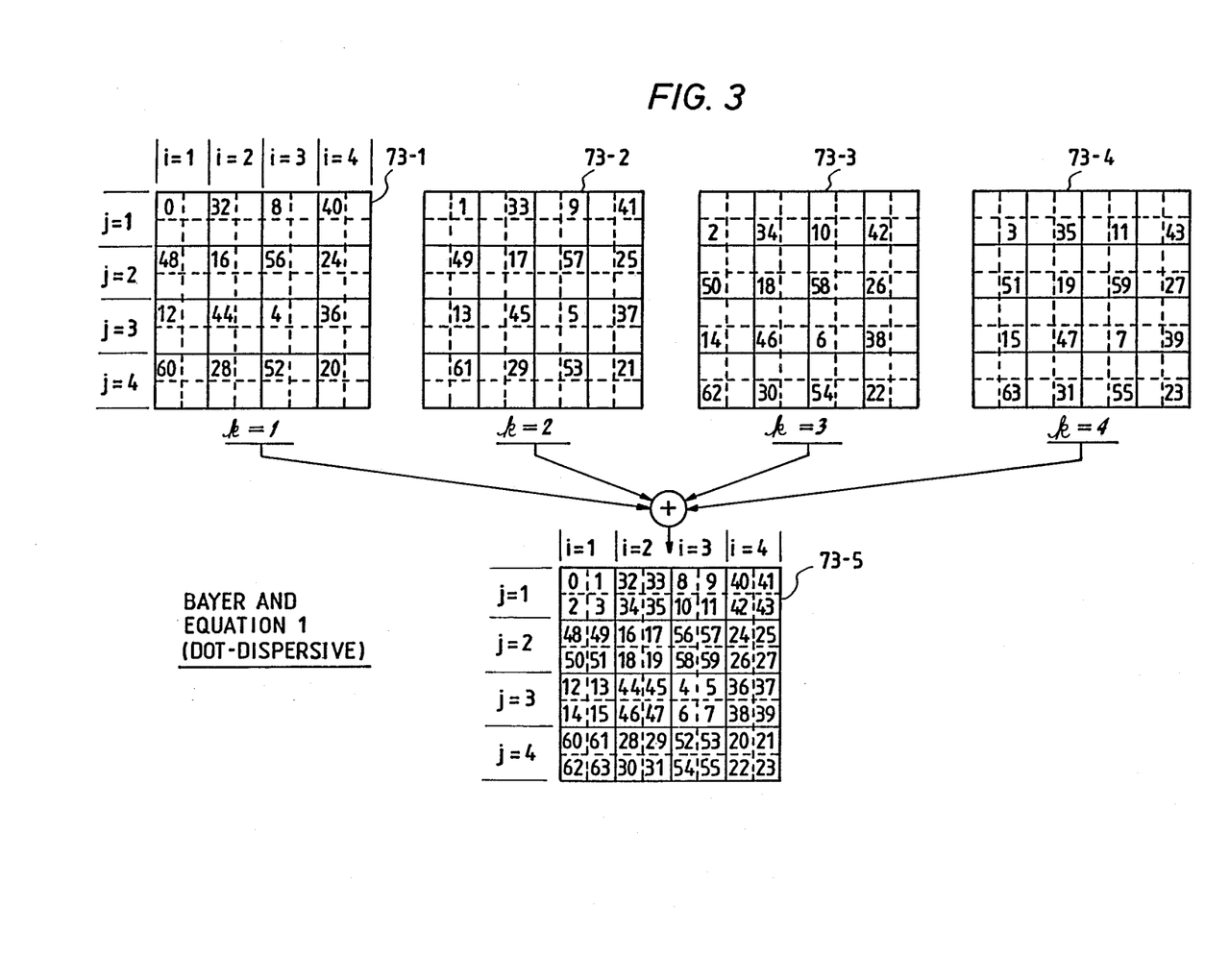
FIG. 3 is a diagrammatic representation of a dot-dispersive ordered-dither distribution of threshold levels based on a combination of a dot-dispersive Bayer distribution on the two-dimensional planes of plural imaginary matrices and a dot-concentrative distribution between different imaginary matrices.

FIG. 3 is an illustration of a specific example of the invention in which Equation 1 (dot-concentrative) and the Bayer distribution (dot-dispersive) are combined to produce a dot-dispersive ordered-dither distribution having an improved image resolution characteristic. Threshold values in digital form (6-bit representation) are stored in those particular cells of each of imaginary matrices 73-1 to 73-4. The threshold values stored in each imaginary matrix have a Bayer distribution and those values stored in positionally corresponding elemental areas of the imaginary matrices have a distribution according to Equation 1 which is dot-concentrative.

Figure 4:
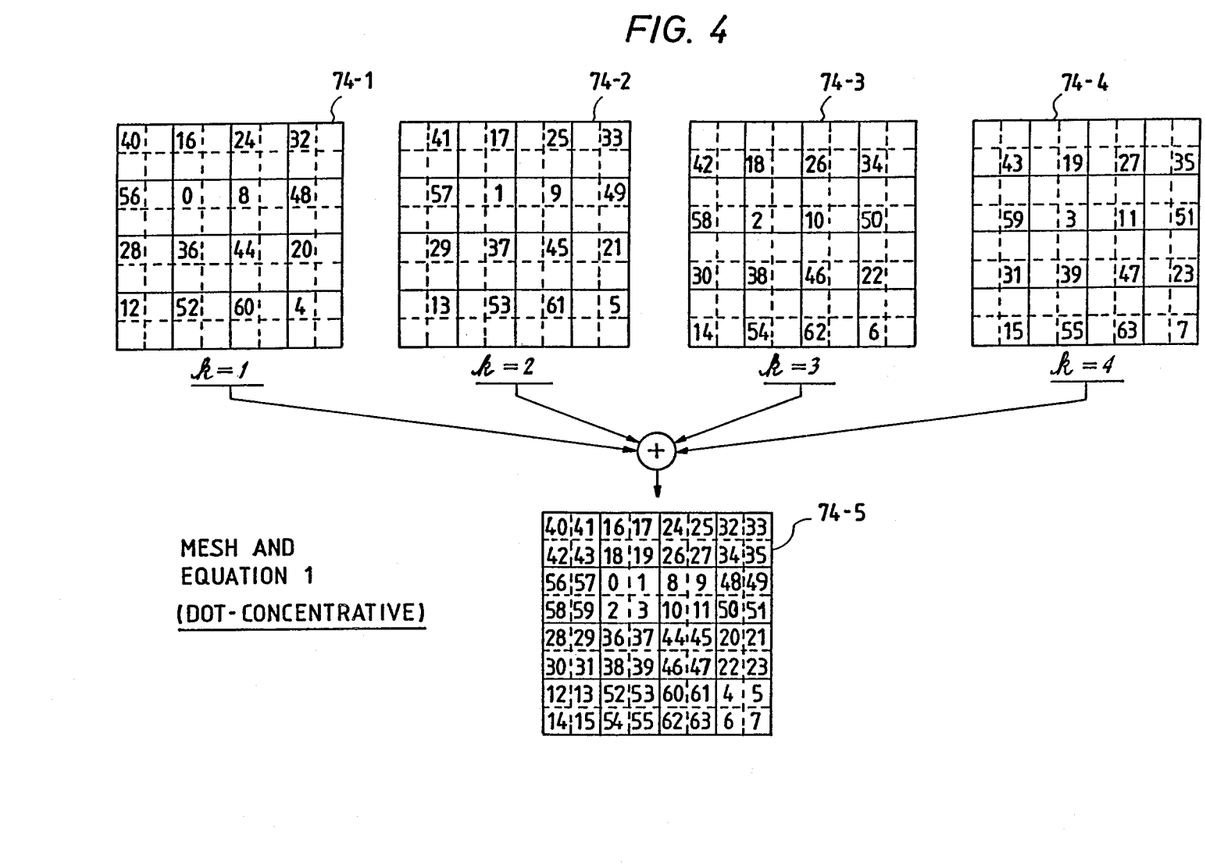
FIG. 4 is a diagrammatic representation of a dot-concentrative ordered-dither distribution of threshold levels based on a combination of a mesh distribution on the two-dimensional planes of plural imaginary matrices and a dot-concentrative distribution between different imaginary matrices.

FIG. 4 is an illustration of a second example in which Equation 1 is combined with a mesh distribution. Digital threshold values stored in each of imaginary matrices 74-1 to 74-4 have a mesh distribution and those values stored in positionally corresponding elmental areas have a dot-concentrative distribution according to Equation 1. The combination of Equation 1 and the mesh distribution results in a dot-concentrative characteristic which emphasizes image gradation.

Figure 5:
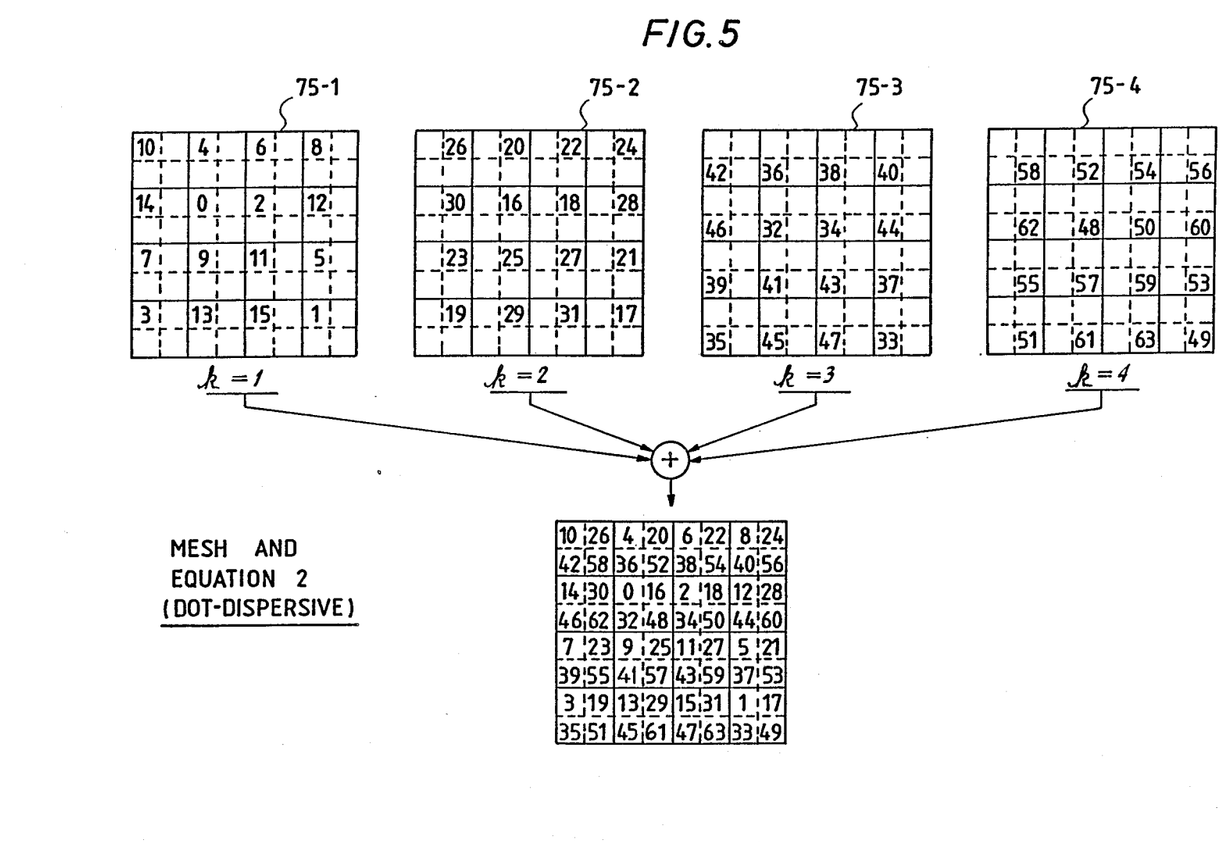
FIG. 5 is a diagrammatic representation of a dot-dispersive ordered-dither distribution of threshold levels based on a combination of a mesh distribution on the two-dimensional planes of plural imaginary matrices and dot-dispersive distribution between different imaginary matrices.

FIG. 5 is an illustration of a third example in which Equation 2 (dot-dispersive) is combined in a manner identical to FIGS. 3 and 4 with a mesh distribution to provide a dot-dispersive characteristic which emphasizes image resolution. Threshold values stored in each of imaginary matrices 75-1 to 75-4 have a mesh distribution and those values stored in positionally corresponding elemental areas have a distribution according to Equation 2, which is dot-dispersive.

Figure 6:
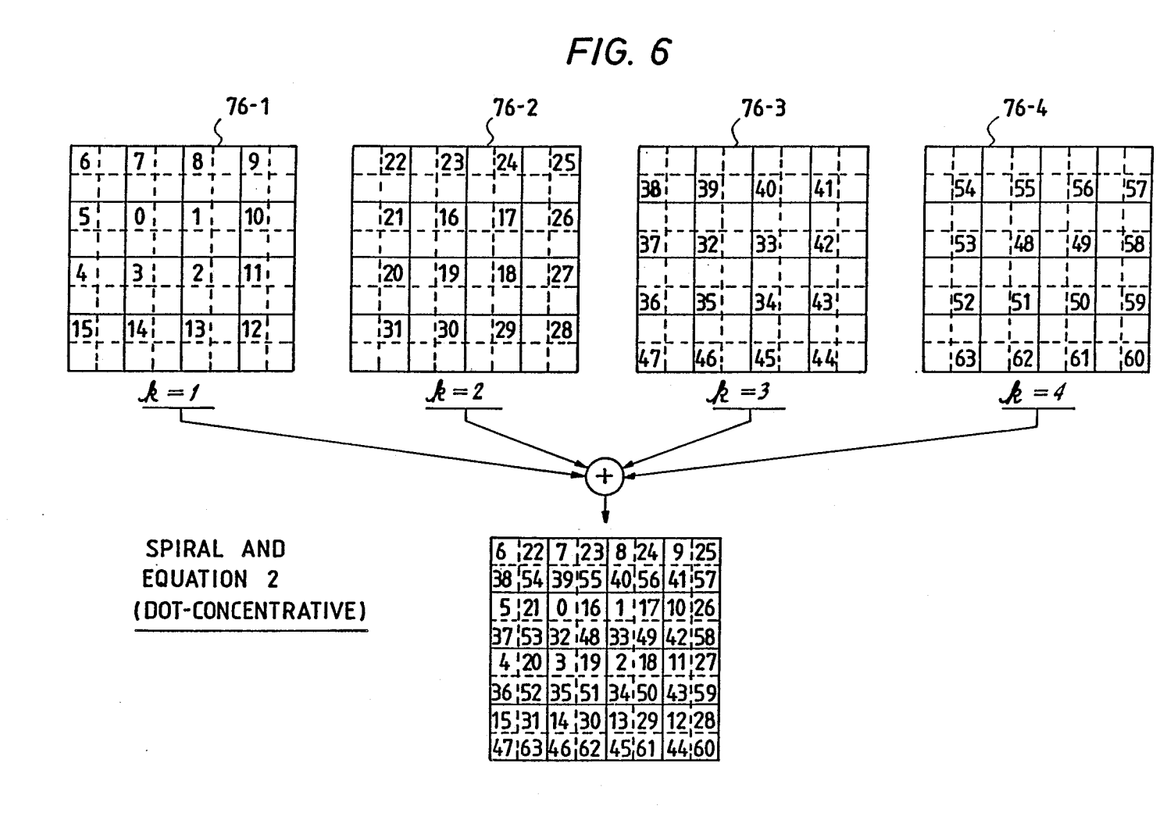
FIG. 6 is a diagrammatic representation of a dot-concentrative ordered-dither distribution of threshold levels based on a combination of a dot-concentrative spiral distribution on the two-dimensional planes of plural imaginary matrices and a dot-dispersive distribution between different imaginary matrices.

FIG 6 is an illustration of a fourth example in which Equation 2, which is dot-dispersive, is likewise combined with a spiral distribution (dot-concentrative) to provide a dot-concentrative characteristic which emphasizes image gradation. Threshold values stored in each of imaginary matrices 76-1 to 76-4 have a spiral distribution and those values stored in positionally corresponding elemental areas have a distribution according to Equation 2.

It is seen therefore that the matrix array of memory 7 can be defined as a set of k ($=\alpha \times \beta$) imaginary matrices each having $N \times M$ elemental areas of $\alpha \times \beta$ cells each (where, N, M, $\alpha$ and $\beta$ are integers, at least one of N and M being greater than unity, and at least one of $\alpha$ and $\beta$ being greater than unity).

Figure 7:
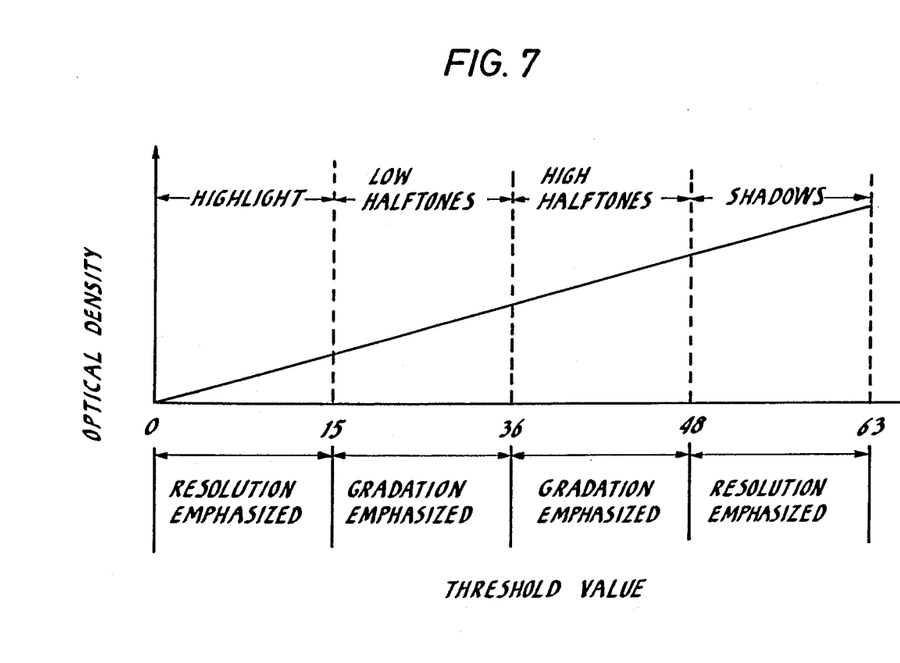
FIG. 7 is a graphical representation of optical density as a function of threshold levels.

According to a practical aspect of the invention, a set of different ordered-dither imaginary matrices is prepared according to the contents of the original. In FIG. 7 in which the optical density of the original is plotted as a function of threshold values ranging from zero to 63, it is shown that image resolution is emphasized in highlight and shadow areas of the original and image gradation is emphasized on delicately varying shading areas having an optical density between low and high halftone values.

Figure 8:
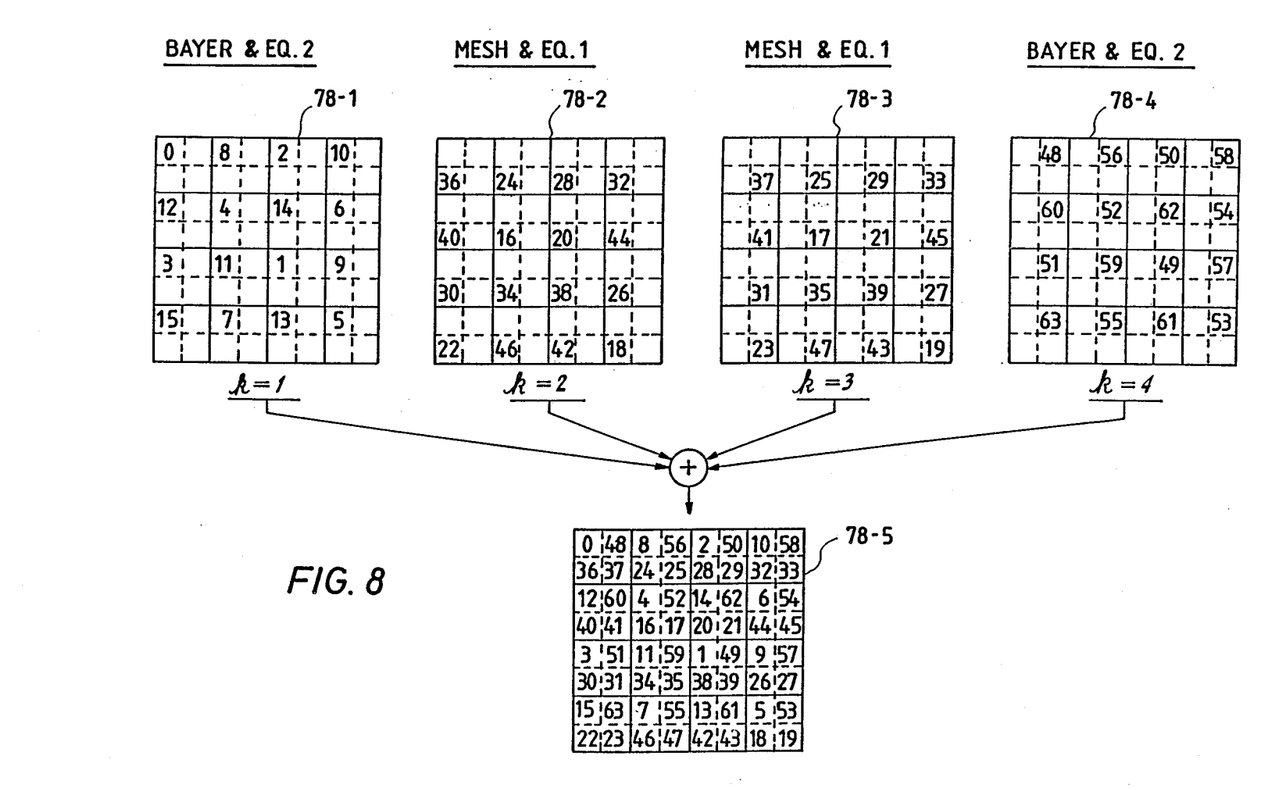
FIG. 8 is a diagrammatic representation of threshold levels based on a combination of Bayer and mesh distributions on the two-dimensional planes of different imaginary matrices and dot-dispersive and dot-concentrative distributions between different imaginary matrices.

As illustrated in FIG. 8, imaginary matrices 78-1 and 78-4 (k=1, k=4) have a combination of a Bayer distribution on each of their planes and a distribution according to Equation 2 between positionally corresponding elemental areas of matrices 78-1 and 78-4 to give emphasized resolution to highlight and shadow portions of the original, respectively. Imaginary matrices 78-2 and 78-3 are formed by a combination of a mesh distribution on each of these imaginary matrices and a distribution according to Equation 1 between positionally corresponding elemental areas of matrices 78-2 and 78-3. Matrices 78-2 and 78-3 emphasize gradation on areas having low and high halftone values. Imaginary matrices 78-1 to 78-4 are combined to form an ordered-dither distribution matrix 78-5.

Figure 9:
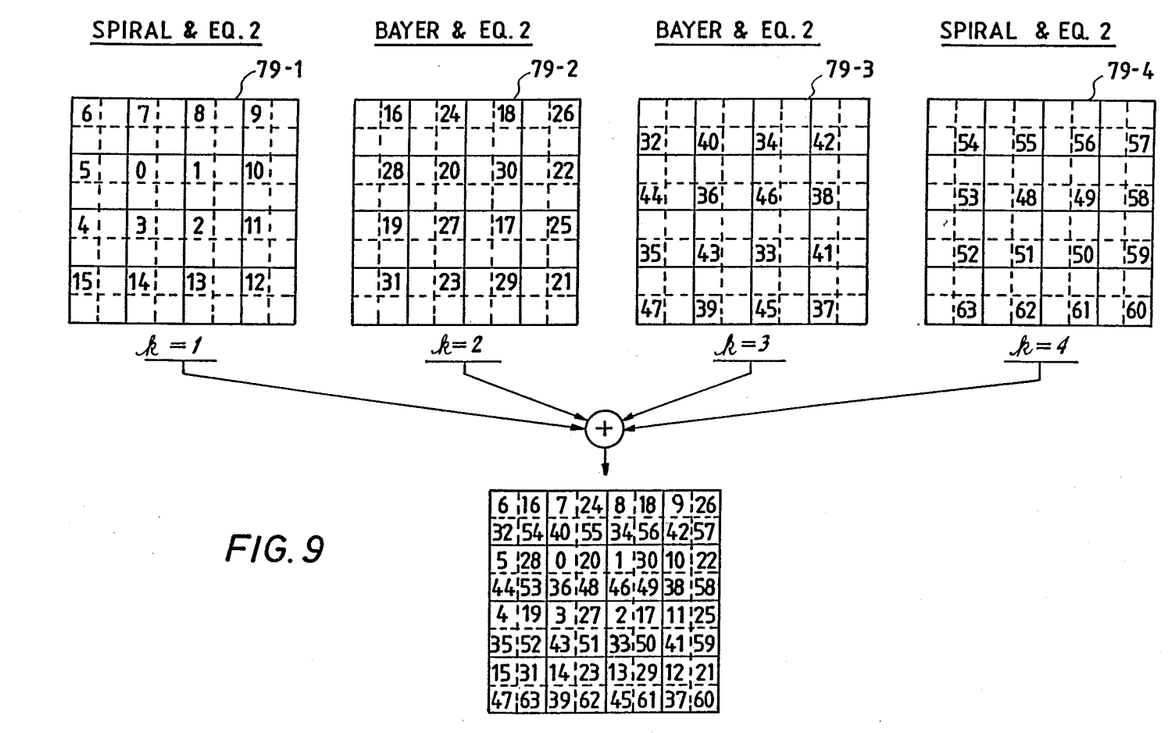
FIG. 9 is a diagrammatic representation of threshold levels based on a combination of spiral and Bayer distributions on the two-dimensional planes of different imaginary matrices and a dot-dispersive distribution between different imaginary matrices.

On the other hand if gradation is to be emphasized for highlight and shadow areas while resolution is to be emphasized on delicately varying halftone areas, it is appropriate to form a set of imaginary matrices as shown in FIG. 9. Imaginary matrices 79-1 and 79-4 are formed by a combination of a spiral distribution on each of these matrices and a distribution according to Equation 2 between positionally corresponding elemental areas of these matrices to impart a dot-concentrative characteristic to the highlight and shadow areas, respectively. Imaginary matrices 79-2 and 79-3 are formed by a combination of a Bayer distribution on each of these matrices and a distribution according to Equation 2 between positionally corresponding elemental areas of these matrices to impart a dot-dispersive characteristic to the halftone areas. Imaginary matrices 79-1 to 79-4 are combined together to produce a matrix 79-5.

A plurality of sets of different ordered-dither distributions are prepared for table memories and a desired one is selected for a particular purpose.

What is claimed is:

1. Apparatus for generating a print signal having one of two discrete levels for each of a plurality of print positions in each of a plurality of print lines depending on a gray scale value on an original for said each print position relative to a threshold value for said each print position, comprising:

memory means comprising an $\alpha M \times \beta N$ matrix array of cells, each cell storing a unique threshold value, where M, N, $\alpha$ and $\beta$ are integers, at least one of $\alpha$ and $\beta$ being greater than unity and at least one of M and N being greater than unity, said matrix array being divided into $\alpha \times \beta$ imaginary matrices each containing $M \times N$ elemental areas, each of said areas containing $\alpha \times \beta$ positions and containing one of said cells at a particular one of said $\alpha \times \beta$ positions, said particular position being different for each of said imaginary matrices, the threshold values stored in the cells of each of said imaginary matrices having a prescribed ordered-dither distribution on the plane of said each imaginary matrix;

first counter means for incrementing a first count for each print position in a particular print line and for addressing said memory means in a given direction in accordance with the first count;

second counter means for incrementing a second count for each print line and for addressing said memory means in a direction normal to said given direction in accordance with the second count;

readout means for reading out a threshold value from said memory means in accordance with the first and second counts; and comparator means for comparing the gray scale value of the original at a position corresponding to a particular print position in said particular print line with said threshold value read out of said memory means and for generating said print signal having one of said two discrete levels.

2. Apparatus as claimed in claim 1, wherein the threshold values stored in the cells of positionally corresponding elemental areas of said imaginary matrices form groups of threshold values, the threshold values in each of said groups successively varying by a predetermined amount according to a prescribed numerical relationship between said imaginary matrices.

3. Apparatus as claimed in claim 2, wherein said threshold values in each of said groups are represented by $C_{ij}+k-1$, where i and j represent columns and rows, respectively, of said elemental areas of said imaginary matrices, $C_{ij}$ represents the threshold value of a cell located in the elemental area in the i-th column and j-th row of a predetermined one of said imaginary matrices, and k is an integer ranging from unity to $\alpha \times \beta$ for identifying said imaginary matrices.

4. Apparatus as claimed in claim 3, wherein said ordered-dither distribution is a Bayer distribution.

5. Apparatus as claimed in claim 3, wherein said ordered-dither distribution is a mesh distribution.

6. Apparatus as claimed in claim 2, wherein said threshold values in each of said groups are represented by $C_{ij}+n(k-1)$, where i and j represent columns and rows, respectively, of said elemental areas of said imaginary matrices, C represents the threshold value of a cell located in the elemental area in the i-th column and j-th row of a predetermined one of said imaginary matrices, k is an integer ranging from unity to $\alpha \times \beta$ for identifying said imaginary matrices, and n is M×N.

7. Apparatus as claimed in claim 6, wherein said ordered-dither distribution in a Bayer distribution.

8. Apparatus as claimed in claim 6, wherein said ordered-dither distribution is a mesh distribution.

9. Apparatus as claimed in claim 6, wherein said ordered-dither distribution is a spiral distribution.

10. Apparatus as claimed in claim 1, wherein said ordered-dither distribution is a Bayer distribution.

11. Apparatus as claimed in claim 1, wherein said ordered-dither distribution is a mesh distribution.

12. Apparatus as claimed in claim 1, wherein said ordered-dither distribution is a spiral distribution.

13. Apparatus as claimed in claim 1, wherein the ordered-dither distribution differs between said imaginary matrices so as to provide a dot-dispersive characteristic for low and high gray scale values of said original and to provide a dot-concentrative characteristic for intermediate gray scale values of said original.

14. Apparatus as claimed in claim 13, wherein the threshold values stored in cells of positionally corresponding elemental areas of said imaginary matrices form groups of threshold values, the threshold values in each of said groups successively varying by a predetermined amount according to a plurality of prescribed numerical relationships between said imaginary matrices.

15. Apparatus as claimed in claim 14, wherein one of said plurality of prescribed numerical relationships is defined by:

$C_{kij}=C_{ij}+k-1$, where i and j represent columns and rows, respectively, of said elemental areas of said imaginary matrices, $C_{ij}$ represents the threshold value of a cell located in the elemental area in the i-th column and j-th row of a predetermined one of said imaginary matrices and k is an integer ranging from unity to $\alpha \times \beta$ for identifying said imaginary matrices, and another of said plurality of prescribed numerical relationships is defined by:

$C_{kij}=C_{ij}+n(k-1)$, where n is M×N.

16. Apparatus as claimed in claim 1, wherein the ordered-dither distribution differs between said imaginary matrices so as to provide a dot-concentrative characteristic for low and high gray scale values of said original and to provide a dot-dispersive characteristic for intermediate gray scale values of said original.

17. Apparatus as claimed in claim 16, wherein the threshold values stored in cells of positionally corresponding elemental areas of said imaginary matrices form groups of threshold values, the threshold values in each of said groups successively varying by a predetermined amount according to a plurality of prescribed numerical relationships between said imaginary matrices.

18. Apparatus as claimed in claim 17, wherein one of said plurality of prescribed numerical relationships is defined by:

$C_{kij}=C_{ij}+k-1$, where i and j represent columns and rows, respectively, of said elemental areas of said imaginary matrices, $C_{ij}$ represents the threshold value of a cell located in the elemental area in the i-th column and j-th row of a predetermined one of said imaginary matrices, and k is an integer ranging from unity to $\alpha \times \beta$ for identifying said imaginary matrices, and another of said plurality of prescribed numerical relationships is defined by:

$C_{kij}=C_{ij}+n(k-1)$, where n in M×N.

19. A method for generating a print signal having one of two discrete levels for each of a plurality of print positions in each of a plurality of print lines depending on a gray scale value of an original for said each print position relative to a threshold value for said each print position, comprising the steps of:

storing a unique threshold value in each of $\alpha M \times \beta N$ storage cells arranged in a matrix array, where M, N, $\alpha$ and $\beta$ are integers, at least one of $\alpha$ and $\beta$ being greater than unity and at least one of M and N being greater than unity, said matrix array being divided into $\alpha \times \beta$ imaginary matrices each containing M×N elemental areas, each of said areas containing $\alpha \times \beta$ positions and containing one of said cells at a particular one of said $\alpha \times \beta$ positions, said particular position being different for each of said imaginary matrices, the threshold values stored in the cells of each of said imaginary matrices having a prescribed ordered-dither distribution on the plane of said each imaginary matrix;

addressing said matrix array in a given direction in accordance with a particular print position in a particular print line and in a direction normal to said given direction in accordance with said particular print line in order to address one of said threshold values stored in said matrix array;

reading out said one addressed threshold value from said matrix array; and comparing the gray scale value of the original at a position corresponding to said particular print position in said particular print line with said one addressed threshold value read out of said matrix array and generating said print signal having one of said two discrete levels.

20. A method as claimed in claim 19, wherein the threshold values stored in the cells of positionally corresponding elemental areas of said imaginary matrices form groups of threshold values, the threshold values in each of said groups successively varying by a predetermined amount according to a prescribed numerical relationship between said imaginary matrices.

21. A method as claimed in claim 20, wherein said threshold values in each of said groups are represented by $C_{ij}+k-1$, where i and j represent columns and rows, respectively, of said elemental areas of said imaginary matrices, $C_{ij}$ represents the threshold value of a cell located in the elemental area in the i-th column and j-th row of a predetermined one of said imaginary matrices, and k is an integer ranging from unity to $\alpha \times \beta$ for identifying said imaginary matrices.

22. A method as claimed in claim 21, wherein said ordered-dither distribution is a Bayer distribution.

23. A method as claimed in claim 21, wherein said ordered-dither distribution is a mesh distribution.

24. A method as claimed in claim 20, wherein said threshold values in each of said groups are represented by $C_{ij}+n(k-1)$, where i and j represent columns and rows, respectively, of said elemental areas of said imaginary matrices, $C_{ij}$ represents the threshold value of a cell located in the elemental area in the i-th column and j-th row of a predetermined one of said imaginary matrices, k is an integer ranging from unity to $\alpha \times \beta$ for identifying said imaginary matrices, and n is $M \times N$.

25. A method as claimed in claim 24, wherein said ordered-dither distribution is a Bayer distribution.

26. A method as claimed in claim 24, wherein said ordered-dither distribution is a mesh distribution.

27. A method as claimed in claim 24, wherein said ordered-dither distribution is a spiral distribution.

28. A method as claimed in claim 19, wherein said ordered-dither distribution is a Bayer distribution.

29. A method as claimed in claim 19, wherein said ordered-dither distribution is a mesh distribution.

30. A method as claimed in claim 19, wherein said ordered-dither distribution is a spiral distribution.

31. A method as claimed in claim 19, wherein the ordered-dither distribution differs between said imaginary matrices so as to provide a dot-dispersive characteristic for low and high gray scale values of said original and to provide a dot-concentrative characteristic for intermediate gray scale values of said original.

32. A method as claimed in claim 31, wherein the threshold values stored in cells of positionally corresponding elemental areas of said imaginary matrices form groups of threshold values, the threshold values in each of said groups successively varying by a predetermined amount according to a plurality of prescribed numerical relationships between said imaginary matrices.

33. A method as claimed in claim 32, wherein one of said plurality of prescribed numerical relationships is defined by:

$C_{kij}=C_{ij}+k-1$, where i and j represent columns and rows, respectively, of said elemental areas of said imaginary matrices, $C_{ij}$ represents the threshold value of a cell located in the elemental area in the i-th column and j-th row of a predetermined one of said imaginary matrices, and k is an integer ranging from unity to $\alpha \times \beta$ for identifying said imaginary matrices, and another of said plurality of prescribed numerical relationships is defined by:

$C_{kij}=C_{ij}+n(k-1)$, where n is $M \times N$.

34. A method as claimed in claim 19, wherein the ordered-dither distribution differs between said imaginary matrices so as to provide a dot-concentrative characteristic for low and high gray scale values of said original and to provide a dot-dispersive characteristic for intermediate gray scale values of said original.

35. A method as claimed in claim 34, wherein the threshold values stored in cells of positionally corresponding elemental areas of said imaginary matrices form groups of threshold values, the threshold values in each of said groups successively varying by a predetermined amount according to a plurality of prescribed numerical relationships between said imaginary matrices.

36. A method as claimed in claim 35, wherein one of said plurality of prescribed numerical relationships is defined by:

$C_{kij}=C_{ij}+k-1$, where i and j represent columns and rows, respectively, of said elemental areas of said imaginary matrices, $C_{ij}$ represents the threshold value of a cell located in the elemental area in the i-th column and j-th row of a predetermined one of said imaginary matrices, and k is an integer ranging from unity to $\alpha \times \beta$ for identifying said imaginary matrices, and another of said plurality of prescribed numerical relationships is defined by:

$C_{kij}=C_{ij}+n(k-1)$, where n is $M \times N$.

* * * * *